US006070177A

United States Patent [19]
Kao et al.

[11] Patent Number: 6,070,177
[45] Date of Patent: May 30, 2000

[54] DATABASE FORMS WITH ATTACHED AUDIT HISTORY

[75] Inventors: James Wei-Ching Kao, Fremont; Mark Hill, Los Altos; Jeffrey G. Ichnowski, Palo Alto; David Tze-Si Wu, Hacienda Heights, all of Calif.

[73] Assignee: Vita Systems, Inc., San Mateo, Calif.

[21] Appl. No.: 09/036,314

[22] Filed: Mar. 6, 1998

[51] Int. Cl.[7] .................................................. G06F 17/30
[52] U.S. Cl. ........................... 707/901; 707/512; 707/10; 707/102
[58] Field of Search .................................. 707/901, 512, 707/10, 102

[56] References Cited

U.S. PATENT DOCUMENTS

| | | | |
|---|---|---|---|
| 5,787,400 | 7/1998 | Weber | 705/1 |
| 5,867,821 | 2/1999 | Ballantyne et al. | 705/2 |
| 5,869,819 | 2/1999 | Knowles et al. | 235/375 |
| 5,878,403 | 3/1999 | DeFrancesco et al. | 705/38 |
| 5,883,940 | 3/1999 | Thornton | 379/88.2 |
| 5,884,284 | 3/1999 | Peters et al. | 705/30 |
| 5,884,328 | 3/1999 | Mosher, Jr. | 707/202 |
| 5,896,440 | 4/1999 | Reed et al. | 379/1 |
| 5,937,160 | 2/1999 | Davis et al. | 395/200.33 |

*Primary Examiner*—Wayne Amsbury
*Attorney, Agent, or Firm*—Blakely, Sokoloff, Taylor & Zafman LLP

[57] ABSTRACT

A system for associating an audit history with a database form is disclosed. In one embodiment of the present invention, a database document is displayed on a first portion of a display on network client computer. An audit history is displayed on a second portion of the display. The audit history contains information describing the transmission history of the document and any action taken with regard to the document. The audit history is updated automatically as the document is transmitted from one user to another user in the network.

19 Claims, 8 Drawing Sheets

300

DATABASE FORM

Field 1 _____

Field 2 _____

Field 3 _____

⋮

Field N _____

302

AUDIT TRAIL

User 1 _____   Action 1 _____

User 2 _____   Action 1 _____

⋮

User M _____   Action M _____

SALES FORECAST REPORT (400)

- 401: SALES FORECAST REPORT
- 403: Form Serial# 11; Form ID# 18

| | | | |
|---|---|---|---|
| Sales Rep: James Doe (402) | Territory: Silicon Valley | Forecast Date: 1/28/98 | |
| District Manager: John Doe | Area Manager: Jane Doe | Regional Manager: Jack Doe | |

404:

| Customer | Stage | Revenue Period | Revenue Type | Revenue | Probability | Extended Revenues | Comment |
|---|---|---|---|---|---|---|---|
| ABC | Cls | Q198 | License | $20,000.00 | 80% | $16,000.00 | |
| XYZ | Cls | Q198 | License | $50,000.00 | 70% | $35,000.00 | |
| | | | | | | $0.00 | |
| | | | | | | $0.00 | |
| | | | | | | $0.00 | |
| | | | | | | $0.00 | |
| | | | | | | $0.00 | |
| | | | | | | $0.00 | |
| Totals | | | | $70,000.00 | | $51,000.00 | |

COMMENTS (406)

Here is a sample Sales forecast report.

410: Audit Trail

| No. (412) | User (414) | Action (416) | Time (418) | Comment (420) |
|---|---|---|---|---|
| 14 | James Doe | submit | 1/22/98 2:11PM | Jeff, This is my forecast |
| 15 | Jeff Doe | approve | 1/22/98 2:13PM | John, This is James forecast |
| 16 | John Doe | approve | 1/22/98 2:14PM | FYI. |

Fig. 4

WEEKLY TIME SHEET

500 ↙

EMPLOYEE INFORMATION  502

| | | | | | | | | Form Serial# | 3 |
|---|---|---|---|---|---|---|---|---|---|
| LOGIN ID: | Johnd | | EMPLOYEE NO: | 2 | | | | Form ID# | 5 |
| DEPARTMENT: | Development | | CUSTOMER: | ABC Corp. | | | | DATE: | 10/24/97 8:00 PM |
| DIVISION: | Intranet Division | | | | | | | WEEK ENDING: | 10/24/97 8:00 PM |

NAME: John Doe

| PROJECT ID: | JOB DESCRIPTION: | M | T | W | TH | F | S | SU | TOTAL |
|---|---|---|---|---|---|---|---|---|---|
| 111 | Java Programming | 4 | 4 | 4 | 4 | 4 | | | 20 |
| 121 | Project Management | 5 | 3 | 3 | 4 | 4 | | | 19 |
| | | | | | | | | | 0 |
| | | | | | | | | | 0 |
| | | | | | | | | | 0 |
| TOTAL HOURS: | | 9 | 7 | 7 | 8 | 8 | | | 39 |

COMMENTS: Here is my timecard.

Audit Trail
No. Usr Action Time Comment 5 John Doe submit 10/24/97 8:01 PM James, Here is my time card  _504_

Fig. 5

MESSAGE FORMAT msg_id "TRANSACTION NUMBER"
32-bit integer unique primary key for each message msg_send_uid "TO"
32-bit interger, user who sent the message msg_recv_uid "FROM"
32-bit integer, user who is to receive the message msg_action "ACTION"
32-bit integer representing type of message

0 = submitted
    1 = approved
    2 = rejected
    3 = completed
    4 = forwarded msg_comment "COMMENT"
text string for comment recording time message sent msg_send_tm "TIME"
date-time stamp recording time message sent msg_status (Not displayed)
status of a message

0 = sending
    1 = received
    2 = acted on msg_req_id (Not displayed)
32-bit integer points to request referred to

Fig. 7

DATABASE FORMS WITH ATTACHED AUDIT HISTORY

CROSS REFERENCE TO RELATED APPLICATION

The present application is related to the following co-pending U.S. Patent Application entitled, "Scripting Language for Distributed Database Programming", having application Ser. No. 09/036,316, and filed on Mar. 6, 1998; which is assigned to the assignee of the present invention.

FIELD OF THE INVENTION

The present invention relates generally to the field of computer networks, and more particularly to a graphical user interface for a networked database program.

BACKGROUND OF THE INVENTION

Electronic database programs are used in a wide variety of business applications. Virtually all aspects of business activity, such as personnel and product management, involve the creation, storage, and management of data. With the advent of computer networks, distributed database processing has allowed many different users to access the same database from individual client computer stations.

Most business databases are large, complex programs that are stored on a central server computer and maintained by dedicated database administrators. As business operations become more complex, and the amount and type of data becomes greater and more varied, creation and administration of databases becomes a greater responsibility for a business organization. To facilitate data entry and management, specifically tailored database forms are often created to present the data corresponding to a specific activity. The task of designing forms and manipulating data within the database often becomes a specific task for specialized personnel. In large organizations, or businesses with complex database requirements, special training is often required to enable general employees to access and use the various databases and electronic forms.

Distributed database programs and electronic forms are generally intended to replace the circulation of certain documents, such as requests for services or products. Under a typical present database model, a database program and data within the databases created with the program are stored on a server computer. Client computers that are to have access to the database program store and execute the same database program or a client version of the database program. Since larger database programs generally require a significant amount of computing resources, such as processor speed and memory space, powerful and expensive client computers must typically be used.

Furthermore, present database programs do not easily allow for the transmission of database forms or data from one user to another. Generally, a privileged user may create or modify data in a particular database. To view this data, a second user is required to bring up the database program and locate the proper file. Thus, in the present database model, transferring a request or document utilizing data in a database from one user to another requires a rather complicated set of operations making it difficult to transmit a particular set of data or a particular form among users. Moreover, present database programs do not allow general users of a particular database to conveniently view the transmission or modification history of a particular data set or form. Present database programs may store a transaction history in a log file, however, such a log is typically stored only on the database server, and may be viewed only by the system administrator or other personnel who has authorized access to such information.

Thus, present database programs do not provide a convenient means for the transmission of database objects among users in a network, nor do they provide for convenient access to the transmission history of these forms.

SUMMARY OF THE INVENTION

The present invention discloses a system for providing an audit trail with a database form. In a method of the invention, a document that is capable of being transmitted between two or more computers in a network is displayed on a first portion of a display device of a computer in the network. A transmission history forming an audit trail of the document is displayed on a second portion of the display device. The transmission history includes information pertaining to the sender of the document, the receiver of the document, and any action taken with regard to the document. The transmission history is automatically updated as the document is transmitted from one user to another user, and cannot be modified by a recipient of the document.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which:

FIG. 3 illustrates a graphical user interface of a database form and associated audit trail according to one embodiment of the present invention.

FIG. 4 illustrates an exemplary database form that includes an audit trail according to one embodiment of the present invention.

FIG. 5 illustrates a second exemplary database form that includes an audit trail according to one embodiment of the present invention.

FIG. 7 is a table that illustrates the format of a message object according to one embodiment of the present invention.

DETAILED DESCRIPTION

Figure 1:
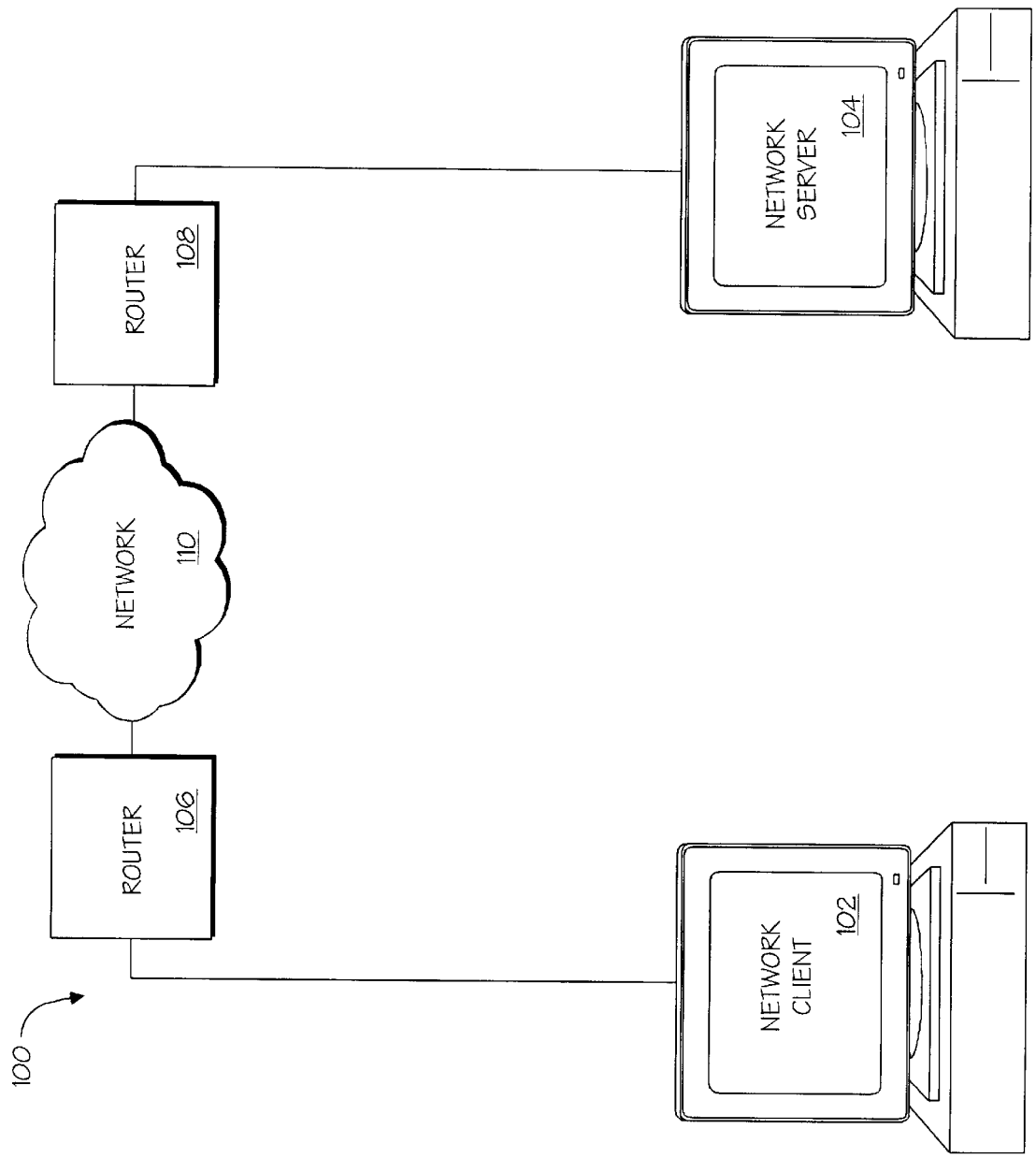
FIG. 1 illustrates a network including client/server computers that transmit and receive data in accordance with one embodiment of the present invention.

A system for associating an audit trail with a database form is disclosed. In one embodiment of the present invention, a database document is displayed on a first portion of a display on network client computer. An audit trail is displayed on a second portion of the display. The audit trail contains information pertaining to the transmission history of the document and any action taken by recipients or users of the document. The audit trail is updated automatically as the document is transmitted from one user to another user.

It is an intended advantage of embodiments of the invention to facilitate the convenient transmission of database documents and forms among users in a computer network.

It is a further intended advantage of embodiments of the invention to provide a viewable audit trail and transmission history of a database document to users of the document.

Hardware Overview

According to the present invention, client computer systems in a network request and receive documents or database files comprising data or object descriptors. According to one embodiment of the present invention, the steps of transmitting and displaying the document or data, as well as other aspects of the present invention are implemented by a central processing unit (CPU) in a client or server computer executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to the present invention.

The instructions may be loaded into the memory of the client computer from a storage device or from one or more other computer systems over a network connection. For example, a server computer may transmit a sequence of instructions to the client computer in response to a message transmitted to the server over a network by the client. As the client receives the instructions over the network connection, the client stores the instructions in memory. The client may store the instructions for later execution or execute the instructions as they arrive over the network connection. In some cases, the downloaded instructions may be directly supported by the CPU. Consequently, execution of the instructions may be performed directly by the CPU. In other cases, the instructions may not be directly executable by the CPU. Under these circumstances, the instructions may be executed by causing the CPU to execute an interpreter that interprets the instructions, or by causing the CPU to execute instructions which convert the received instructions to instructions which can be directly executed by the CPU. In other embodiments, hardwired circuitry may be used in place of, or in combination with, software instructions to implement the present invention. Thus, the present invention is not limited to any specific combination of hardware circuitry and software, nor to any particular source for the instructions executed by the client computer.

FIG. 1 illustrates a network 100 in which data files are transmitted between networked computers. Client computer 102 is coupled to a server computer 104 through network 110. The network interface between client 102 and server 104 may also include one or more routers, such as routers 106 and 108, which serve to buffer and route the data transmitted between client 102 and server 104. Network 110 may be the Internet, a Wide Area Network (WAN), a Local Area Network (LAN), or any combination thereof. Network server 104 contains application programs and/or data which are accessible over the network by other network stations, such as network client 102. In one embodiment of the present invention, network server 104 is a World-Wide Web (WWW) server which stores data in the form of 'web pages' and transmits these pages as Hypertext Markup Language (HTML) files over the Internet network 110 to network client 102. To access these files, network client 102 runs a 'web browser', which is simply an application program for accessing and providing links to web pages available on various Internet sites. In a typical Internet client-server environment, the client computer accesses the Internet through a single point of contact, commonly referred to as an Internet Service Provider (ISP) or on-line service provider.

Figure 2:
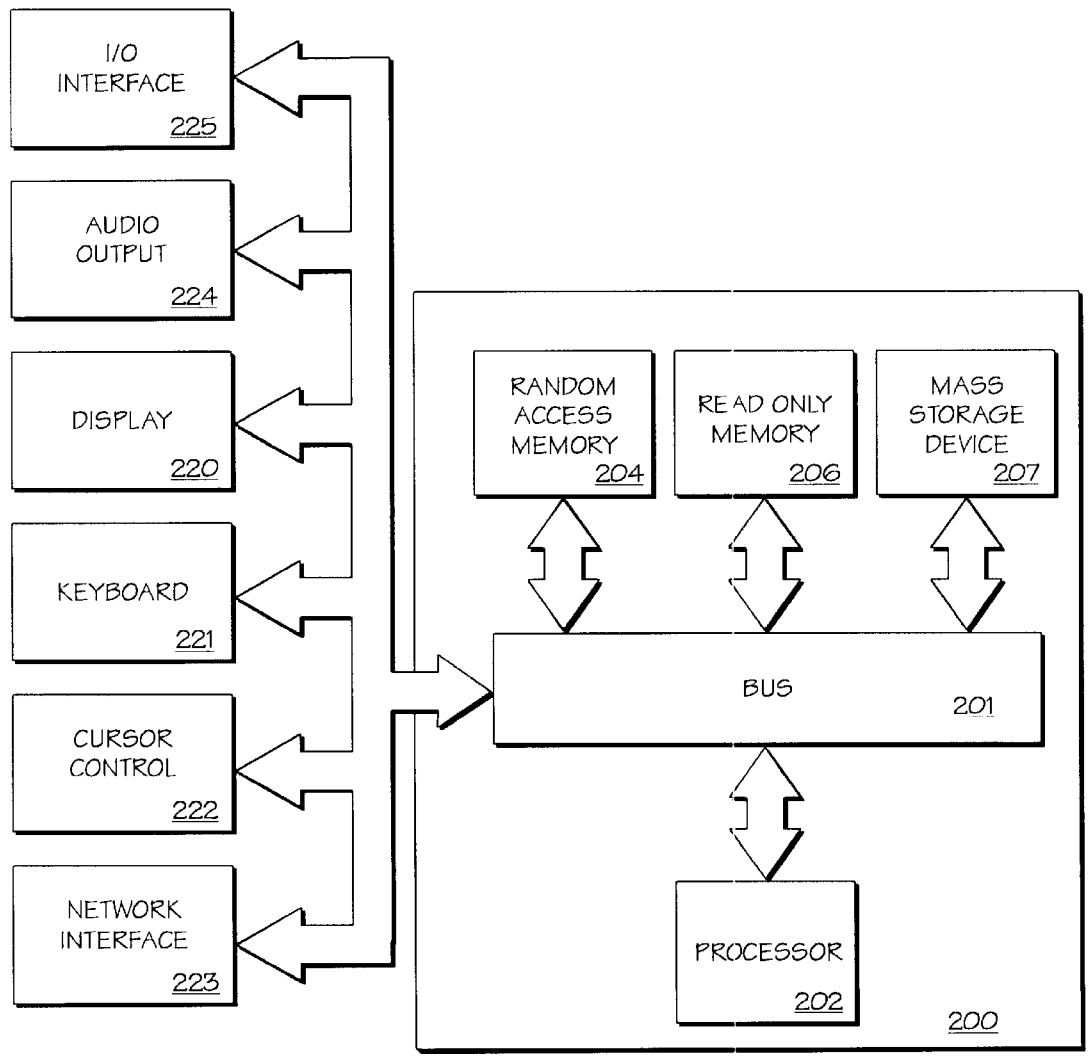
FIG. 2 is a block diagram of a client computer system that implements a database system according to one embodiment of the present invention.

FIG. 2 illustrates a block diagram of a representative client computer such as network client 102 illustrated in network 100 of FIG. 1. The computer system 200 includes a processor 202 coupled through a bus 201 to a random access memory (RAM) 204, a read only memory (ROM) 206, and a mass storage device 207. Mass storage device 207 could be a disk or tape drive for storing data and instructions. A display device 220 for providing visual output is also coupled to processor 202 through bus 201. Keyboard 221 is coupled to bus 201 for communicating information and command selections to processor 202. Another type of user input device is cursor control unit 222, which may be a device such as a mouse or trackball, for communicating direction commands which control cursor movement on display 220. Also coupled to processor 202 through bus 201 is an audio output port 224 for connection to speakers which output the audio content produced by computer 200. Further coupled to processor 202 through bus 201 is an input/output (I/O) interface 225 which can be used to control and transfer data to electronic devices connected to computer 200.

Network interface device 223 is coupled to bus 201 and provides a physical and logical connection between computer system 200 and the network medium. Depending on the network environment in which computer 200 is used, this connection is typically to a server computer, but it can also be to network router or another client computer. Note that the architecture of FIG. 2 is provided only for purposes of illustration, and that a client computer used in conjunction with the present invention is not limited to this specific architecture.

In one embodiment of the present invention, network client 102 is a personal computer that interfaces to network 110 through a modem, or similar network interface device. In an alternative embodiment, the network client 102 represented by computer system 200 may be a dedicated Internet access product, such as a Network Computer (NC).

Database User Interface

In one embodiment of the present invention, the network client 102 illustrated in FIG. 1 sends and receives documents and data structures over network 110 to network server 104 and other network clients. Network server 104 stores and executes application programs that create and store files and data that can be transmitted and further processed by network client 102. Examples of such application programs include database programs, word processing programs, electronic mail ("e-mail") programs, and other like programs. For purposes of the following discussion, such programs will be referred to as "database" programs, however, it should be noted that this term refers to several different types of programs that are capable of storing data of any kind in an organized manner.

In one embodiment of the present invention, network server 104 executes a database program and stores data created for that program. The data can be entered into the server computer directly or into a client computer coupled to the server over a network. In one embodiment of the present invention, network client 102 locally executes a client program so that a user of network client 102 can remotely access the data stored in network server 104.

Various types of data relating to different activities can be stored in network server 104 by the database application. For each different activity or type of data, a user can create a form to facilitate the entering of data. A form is simply a template that provides data entry fields and associated labels. Such a form typically consists of a number of fixed fields that indicate the type of data or information to be entered, and a data entry field for the entry of data by the user. For one embodiment of the present invention, a form may be transmitted among computers in a network. A form may be transmitted only from one user to another user, or it may be transmitted serially among several users in turn. Some or all of these users may have the ability to modify the data within the form, or they may be allowed only to view the form and not make any changes.

In one embodiment of the present invention, the data entry area of a database form is displayed in one portion of the display screen of a client or server computer. An audit trail display area is displayed in a second portion of the display screen. FIG. 3 illustrates an generalized example of the display of a database form and an audit trail according to one embodiment of the present invention. Display screen 300 includes a first display area 302 and a second display area 304. The first display area 302 contains a database form, or a portion of a database form. A typical database form will include various fields for the entry and display of data. For example, in database form 302, a number of different fields are provided for the entry of data. The fields are denoted Fields 1 to N, and each field label is followed by an area for data to be entered or displayed. The database form provides a convenient means of organizing and displaying data related to a particular activity or object. The database form can be transmitted from one user of a network to another user of the network, and the layout and data contents of the form will not change, unless a particular user is authorized to make a change prior to transmission to another user. In this manner, the form is intended to be an electronic equivalent of a circulated hardcopy document.

The second display area 304 of display screen 300 contains an audit trail display area. In one embodiment of the present invention, audit trail display area 304 contains information relating to the transmission history of database form 302. Audit trail display area 304 lists such information as the name or ID of the user who created the form, the names or ID's of each of the users who received the form, the data and time of reception, any action taken by each user, and other such information. In this manner, the audit trail display area 304 provides a means by which the transmission history and actions taken regarding a particular document, set of data, or database form may be viewed by the users of the document or form.

In one embodiment of the present invention, the audit trail display area is always transmitted along with, and displayed with the document or form with which it is associated. As the document or database form 302 is transmitted from one user to another user in a network, the information relating to each user is appended to the audit trail. Thus, the audit trail maintains a running list of the users that have received the document or form.

It should be noted that the audit trail area 304 need not necessarily be displayed below the database form 302, as illustrated in FIG. 3. The audit trail display area may be placed in any portion of the display screen relative to the database form. For example, the audit trail may be displayed above the form or on either side of the form. The audit trail display area may also be displayed as a tiled or overlapping window that is displayed over or partially under a portion of the database form.

FIG. 4 illustrates a particular application of the audit trail with a specific type of database form according to one embodiment of the present invention. Display screen 400 contains a database form titled "Sales Forecast Report" 401. This form illustrates a typical type of form that may be used by the Sales department in a company to track sales of products to particular customers. The Sales Forecast Report contains various fields for the entry and display of pertinent information. Typical fields included in such a form include personnel information fields 402 for entering and displaying departmental, personnel, and related information. Other fields include customer and revenue fields 404 which provide data entry fields for customer information and sales figures. A comments field 406 is included to provide an area for the entry of text describing particular aspects of the form or the data stored therein. Form identification fields 403 are included to provide reference data for the particular form being used.

Associated with the Sales Forecast Report form 401 is audit trail 410. Audit trail 410 lists the various users that receive or use the report. In the example of FIG. 4, the Sales Forecast Report was created and submitted by user James Doe. The report was then transmitted to user Jeff Doe for approval, and then to user John Doe for final approval. In one embodiment of the present invention, as a user receives the report, the name or identification of that user is appended to the audit trail. The audit trail 410 of Sales Forecast Report 401 contains several fields for the display of pertinent information regarding each user's activities regarding the report. Such information includes a "User" field 414 that identifies the user by name or similar identification (e.g., employee number), and an "Action" field 416 that lists the action taken on the form by each respective user. In the example of FIG. 4, the action field indicates that user James Doe submitted the form, and the subsequent recipients of the form both approved the form. The "Time" field 418 provides the date and time at which a user performed the action on the report. A comment field 420 is provided to allow a user to type text information pertaining to the report or any action taken with respect to the form, or any other desired information. In most implementations, each transaction involving a particular form or document will be assigned a transaction number that identifies a particular transaction. The "No." field 412 provides the display area for the transaction number associated with each audit trail entry. These numbers may be assigned chronologically so that higher numbers correspond to later transactions.

In one embodiment of the present invention, some of the fields within the audit trail display area 410 are automatically entered by the client computer or server computer upon a specific event, such as a user receiving a form, opening the form, modifying the form, transmitting the form, or other similar activities. Such automatically entered information includes the user name or ID, transaction time, and transaction number. Other fields in the audit trail may be text entry fields that allow a user to type information directly into the audit trail. These fields may include the comment field and the action field. Alternatively, these fields may be entered through the use of pull-down menus that allow the user to select the appropriate response from a selection of possible entries. The action field 416 represents one field that may be filled out automatically by the system instead of directly by the user. For example, an action such as a user modifying data within the database form may cause the system to enter "modified" or "rejected" in the action field for that user. In an alternative embodiment, certain fields of the audit trail may also be linked with fields within the database form so that data that is contained in the form is also entered in the audit trail. For example, text entered into Comments field 406 of Sales Forecast Report 401, may be entered automatically into Comment field 420 of audit trail 410.

In one embodiment of the present invention, audit trail 410 is always transmitted along the associated document, (e.g., Sales Forecast Report 401), and displayed with the document. In this manner, each recipient or user of the report or document can easily see the transmission history of the report and the actions taken with regard to the report. FIG. 4 thus illustrates how an audit trail can be used to track a particular document through a review or approval hierarchy within an organization.

In one embodiment of the present invention, the database form or document associated with a particular audit trail cannot be modified by subsequent users or receivers of the form. Only the originator of the form or document can modify the form. Subsequent receivers of the form are generally limited to viewing and approving or rejecting the form. This mechanism maintains the integrity of the original form, and provides a robust record of those who viewed the data.

In an alternative embodiment of the present invention, a subsequent user or receiver of a form may be authorized to make changes or revisions to the contents of a form. This mechanism allows a receiver to directly make a revision without requiring the second user to reject the original document, convey the rejection to the first user, and instruct the first user to change the document accordingly. For this embodiment, a revised value is shown in a different style than the original value, thus providing notice that a modification has been made. For example, a new value can be displayed in a different text style, font, or color. Alternatively, a second form could be created in a composite or tiled display manner to indicate that the originally submitted form has been superseded with a revised form. Many other similar mechanisms could be employed to indicate that a modification has occurred. For this embodiment, the audit trail display area still maintains a permanent list of the users that receive and approve or modify the form.

FIG. 5 illustrates a second example of an audit trail display area used in conjunction with a particular database form. Database form 502 is a Weekly Time Sheet that is filled out and submitted by an employee to a supervisor or personnel department. The Time Sheet form 502 contains several fields for the entry of data relating to the tasks performed and the time spent on each task. The time sheet portion of the database form is displayed in one portion (e.g., the top portion) of a display screen 500. In one embodiment of the present invention an audit trail display area 504 is displayed in a second portion of the display screen 500. As can be seen in the example of FIG. 5, the audit trail display area contains data relating to the transmission history of the database form from one user to another. As illustrated in audit trail 504, the audit trail data may be presented in various different formats, depending on display constraints and other factors.

It should be noted that many other forms for various applications may be used in conjunction with the audit trail in accordance with embodiments of the present invention. Examples of other such forms include supply requests, vacation requests, expense reports, insurance claim forms, reimbursement requests, and any other form or document that requires circulation among different personnel or users in a computer network.

Database Construction

In one embodiment of the present invention, the database is implemented as a Binary Large Object ("BLOB") data type. A Binary Large Object is a variable-length data type that is commonly used to store complex data, such as graphics images, audio data, and other non-textual data. The routing information regarding a document or form is maintained separately from the form itself and the data stored in the form.

Figure 6:
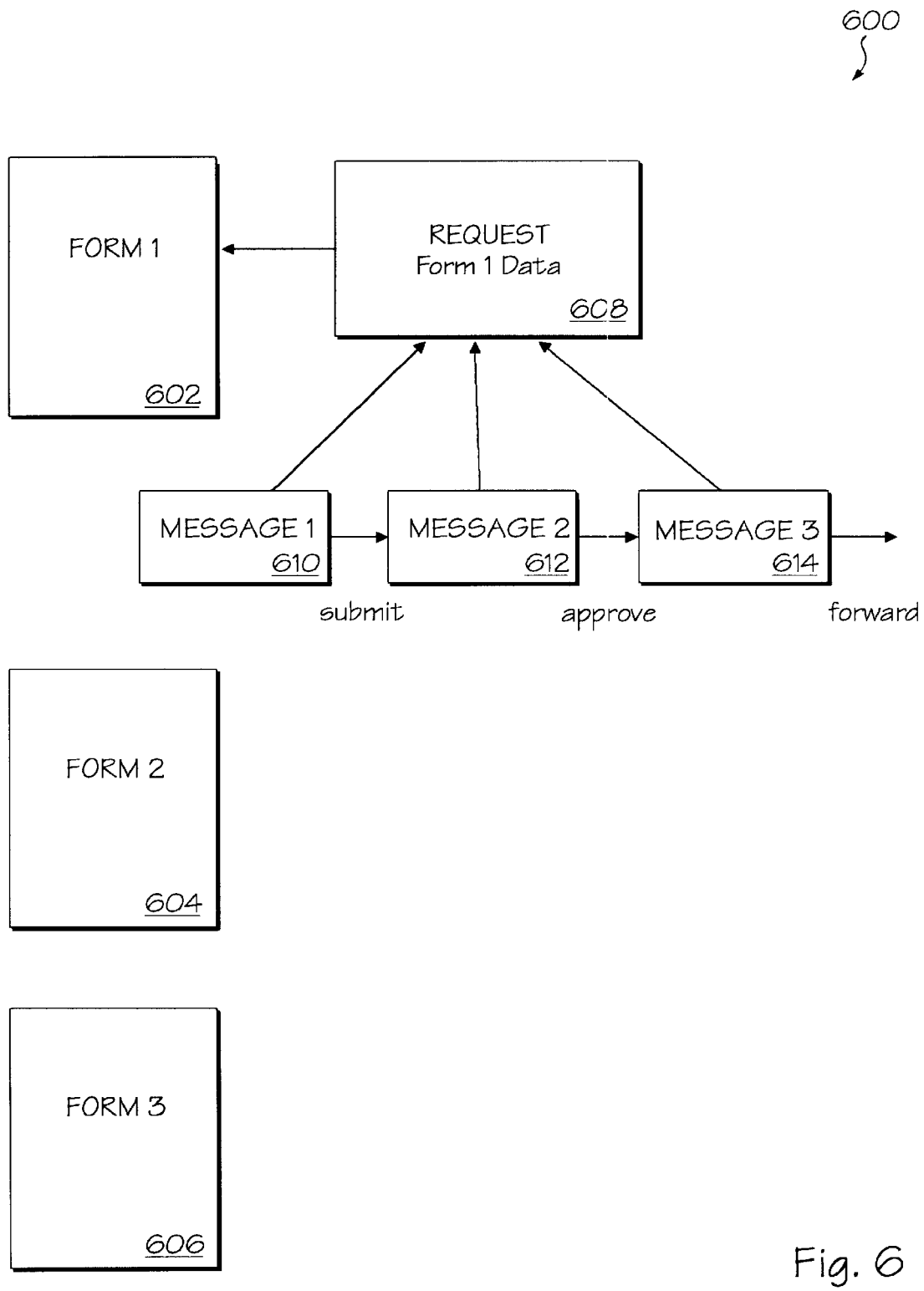
FIG. 6 is a block diagram illustrating the relationship between a database request and messages in an audit trail for the request, according to one embodiment of the present invention.

FIG. 6 is a block diagram that illustrates the relationship among the database form description, database data, and audit trail data according to one embodiment of the present invention. One or more database forms are created to facilitate the entry of data relating to a particular activity. In one embodiment of the present invention, the database forms are created using a form description language or similar object oriented language, such as C++. In one embodiment of the present invention, form description files for the various different database forms are created using the Abstract Window Toolkit ("AWT") of the Java™ programming language. Java is a trademark of Sun Microsystems, Inc. in the United States and other countries. AWT is a Java class library for graphical user interface ("GUI") programming. On a client computer, the form is loaded into a Java applet to be produced into an editable graphical object for display on the display device of the client computer.

Block diagram 600 of FIG. 6 illustrates three different database forms 602, 604, and 606. Each database form serves as a template for the entry and display of data, and is constructed using a form description language. When a form is filled out by a user, it has associated with it a set of data. The data is created and stored separately from the form description data. In one embodiment of the present invention, the data entered into a form comprises data that is referred to as a "Request" object. The request represents an instance of a form, i.e., a filled out form comprising the form description and a particular set of data. Thus, a request contains a pointer to a corresponding database form and the data entered into the form. In FIG. 6, request 608 contains the data entered for database form 1, 602. When filled out, database forms 2 and 3, 604–606, will also each contain corresponding requests, such as request 608, however, these are not shown for purposes of clarity.

In one embodiment of the present invention, an action completed on a request is referred to as a "Message" object. There are several different message types, corresponding to the various different actions that users may take with regard to a particular request. For example, upon filling out a form and creating a request, a user submits the request for review or approval by a second user. A typical application would be an employee submitting a request to a supervisor. The second user may approve or disapprove the request and forward the request to a third user or return the request back to the first user. The second user may also forward the request to a third user without either approving or disapproving the request. A request may be terminated by certain actions such as a final approval or disapproval by subsequent users, or withdrawal by the first user.

In an alternative embodiment of the present invention, a subsequent user may also modify the request by altering data within the request. A modification of a request by a subsequent user creates a second related request or sub-request. The modified data could be displayed in the form in various styles that differ from the display style of the original data. For example, the modified data could be displayed in a different color or shade from the original data, or any other stylistic indicator can be chosen to differentiate the revised data. Such a difference is desirable since the original user or other recipients of the request should be able to easily see the changes that were made to the original request. Such a mechanism also provides a more faithful revision history of the request that is useful if the request is audited.

Each transaction or activity relating to a particular request creates a message object that stores data regarding the transaction or activity. For example, in FIG. 6, request 608 is referenced by three messages 610 to 614. Message 1, 610, corresponds to the first user creating the request and submitting the request for approval by a second user. Message 2, 612, corresponds to approval by the second user. In the example of FIG. 6, the second user transmits the request to a third user, and the third user in turn forwards the request along to yet another user. In this case, message 3, 614, corresponds to the forwarding of the request by the third user.

As can be seen in FIG. 6, the main components of a request transmitted among users in a network are created and stored separately from one another. The form description data is separate from the data entered into the form for a particular request. In addition, the data comprising each message is created and stored separately from the data comprising the request. In this manner, data in the audit trail can only be added or modified by specific actions related to transmission of the request, and is not affected by data relating to the form or data entered into the form. Thus, the present invention provides a robust mechanism for creating and displaying the transmission history of a request, and provides a record of actions taken on a request that can be used to audit the request.

FIG. 7 is a table that lists the data stored within each message, according to one embodiment of the present invention. Each message contains several items of data pertaining to the transmission of the request and the action taken on the request by each user. Each message is assigned a transaction identification number which is stored in the "Transaction Number" field. The "To" field indicates the next user to whom the request is being transmitted and the "From" field indicates who transmitted the request to the present user. The transaction number is automatically assigned and provided by a server computer coupled to the client computers over a network. Likewise, the To and From fields are provided by the server computer based on user log-in data for each client computer.

The "Action" field in FIG. 7 indicates the particular action performed on the request by a particular user. As stated previously, possible actions include submit, approve, disapprove, forward, and so on. The "Comment" field provides storage for notes typed by a user in relation to the request. The "Time" field indicates the time of reception of the request by the present user. Typically, this time information is provided by the clock on the server computer and input automatically into this field.

Each message also includes certain information that is not displayed. This information includes the status of the message and a pointer to the request which the message is referencing. It should be noted that the message format illustrated in FIG. 7 is an example of the type of data that may be provided in the audit trail. Other items of information relevant to the transmission or activity of a request, but not shown in FIG. 7, may be included in the message as well, depending on the type of information to be tracked in the audit trail.

In one embodiment of the present invention, the audit trail for a particular request is created by storing the messages for the request in an audit trail array. The messages may be stored in chronological order based on the transaction number or time, or in an order based on a different item in the message, e.g., the action taken. As messages are created based on transactions involving the request, the messages are appended to the audit trail array. Data within the audit trail array is then compiled into a table for display. In one embodiment of the present invention, the audit trail table is displayed in an audit trail display area adjacent to the database form used for the corresponding request, such as is illustrated in FIG. 3.

Figure 8:
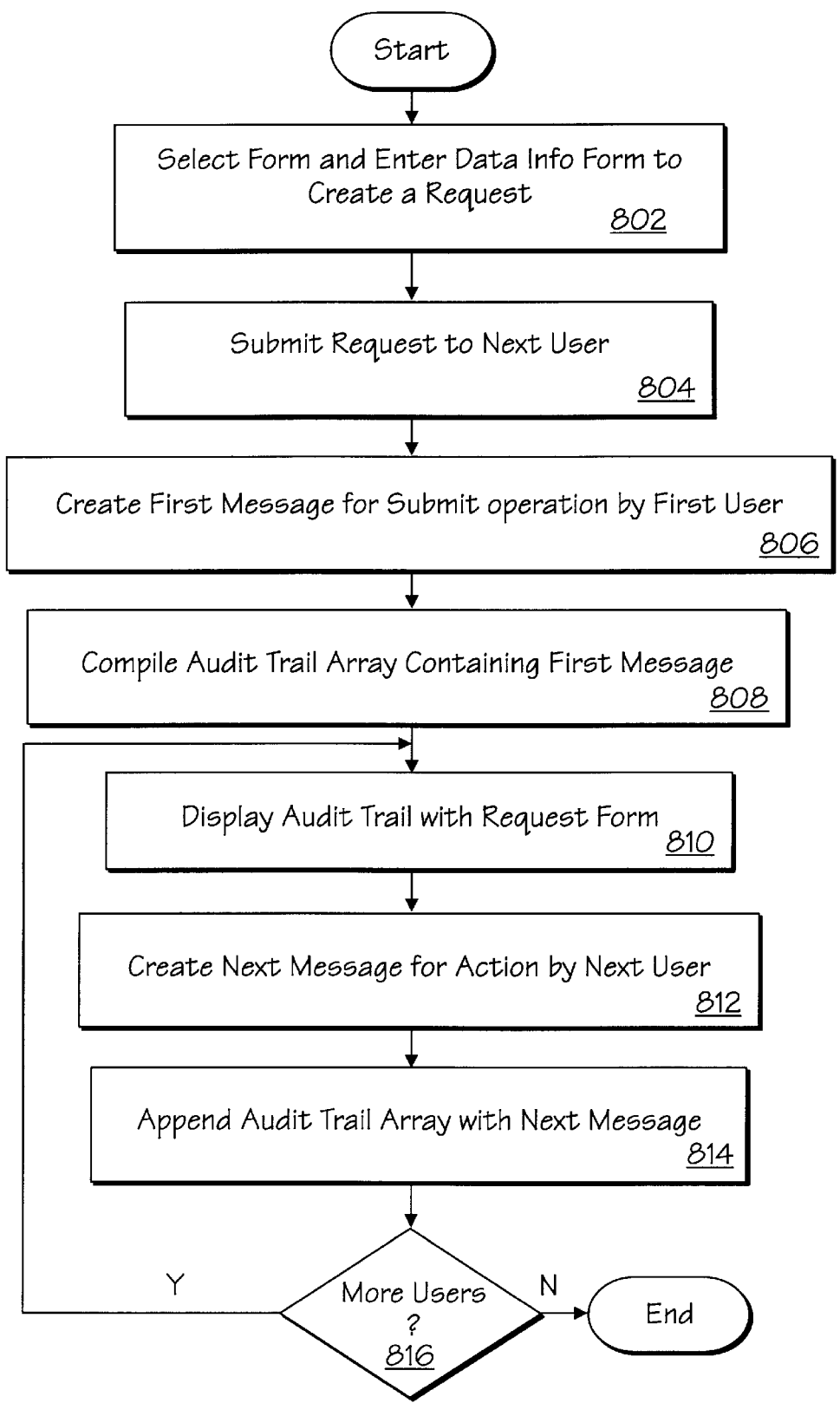
FIG. 8 is a flowchart illustrating the process of displaying an audit trail with a database form or document according to one embodiment of the present invention.

FIG. 8 is a flowchart that illustrates the steps of creating an audit trail for a database form or document that is transmitted among users in a network according to a method of the present invention. In step 802, a user selects a database form to use for a particular request and enters data in the appropriate fields of the form to formulate a request. After completing the form, the user submits the form to the subsequent user or users, step 804. Upon submission of the request by the first user, a first message is created, step 806. The first message is entered into an audit trail array, step 808. The audit trail array is then transformed into a displayable object and displayed with the request form on the display of the next user, step 810. Upon receipt of the request by the next user and any action by that user, a next message for the request is created, step 812. The data comprising the next message is information such as that illustrated in FIG. 7.

In step 814, the next message is appended to the audit trail array. The action by the next user may require further transmission of the request to another user. In step 816, it is determined whether the request is to be transmitted to a subsequent user. The subsequent user could be another user in the network, or it could be the originator of the request. If the request is not to be transmitted, the process ends. If, however, the request is to be transmitted to another user, the appended audit trail is displayed with the request form on the next subsequent user's display, step 810. The process then repeats with the creation of another message for this user, step 812, and the appending of the audit trail array, step 814.

The completed audit trail thus contains a view of all messages along the flow of a request, where the flow is defined as the path of the request through the distributed database network. For each user in the flow, the audit trail is displayed with a request, and is not alterable by any of these users. Thus, the audit trail provides a reliable record of the transmission history and disposition of the request.

In the foregoing, a system has been described for displaying an audit trail with a database form or document that is transmitted among users in a network. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A computer-implemented method for displaying an audit trail of a document on a display device, said method comprising the steps of:

displaying said document on a first portion of said display device;

displaying said audit trail on a second portion of said display device; and automatically updating said audit trail when information relating to transmission of said document from one user to another user in a network changes.

2. The method according to claim 1 further comprising the steps of storing in a first data field in said audit trail, data specifying a first user, said first user causing said document to be transmitted to a second user over said network;

storing in a second data field in said audit trail, data specifying said second user; and storing in a third data field in said audit trail, data specifying any action taken with regard to said document by said first or second user.

3. The method according to claim 2 wherein said audit trail is displayed as a chronological log.

4. The method according to claim 3 wherein said document comprises a database object, said database object comprising a database form description file, and a data file, said data file comprising data entered by said first user into a form described by said database form description file.

5. The method according to claim 4 wherein said action taken by said first or second user comprises one or more of approving said document, disapproving said document, or forwarding said document to a third user.

6. The method according to claim 5 wherein said action taken by said first or second user further comprises modifying one or more items of data within said data file.

7. The method according to claim 6 wherein data modified by said second user is displayed differently than data originally entered by said first user.

8. The method according to claim 4 wherein said audit trail comprises a data array containing:

user data specifying said first user and any other user in said network to which said document has been transmitted; and action data specifying said any activity taken on said document by a corresponding user of said document, and wherein said user data and corresponding action data is stored in said data array in a predetermined order.

9. The method according to claim 8 wherein predetermined order is determined by the order in which said document is received by users in said network.

10. The method according to claim 8 wherein data contents of said data array for said audit trail is provided automatically by a server computer coupled to said network, and wherein said data contents may not be modified by any user client in said network.

11. An apparatus for displaying an audit trail of a document on a display device, said apparatus comprising:

means for displaying said document on a first portion of said display device; and means for displaying said audit trail on a second portion of said display device, said audit trail being automatically updated when information relating to transmission of said document from one user to another user in a network changes.

12. The apparatus according to claim 11 further comprising:

means for storing in a first data field in said audit trail, data specifying a first user, said first user causing said document to be transmitted to a second user over said network;

means for storing in a second data field in said audit trail, data specifying said second user; and means for storing in a third data field in said audit trail, data specifying any action taken with regard to said document by said first or second user.

13. The apparatus according to claim 12 wherein said document comprises a database object, said database object comprising a database form description file, and a data file, said data file comprising data entered by said first user into a form described by said database form description file.

14. The apparatus according to claim 13 wherein said audit trail comprises a data array containing:

user data specifying said first user and any other user in said network to which said document has been transmitted; and action data specifying said any activity taken on said document by a corresponding user of said document, and wherein said user data and corresponding action data is stored in said data array in a predetermined order.

15. A user interface for display on a computer, said user interface comprising:

a first display area containing a document capable of being transmitted between a first user and a second user in a computer network; and a second display area containing an audit trail, said audit trail comprising data relating to identification of senders and receivers of said document, and data relating to any activity undertaken by any of said senders and receivers of said document in relation to said document.

16. The user interface according to claim 15 wherein said audit trail is displayed as a transmission history presented as a chronological log listing the identity of users in said network in the order in which they receive said document.

17. The user interface according to claim 16 wherein said audit trail is automatically updated when information relating to transmission of said document from one user to another user in said network changes.

18. An article of manufacture embodying a program of instructions executable by a machine, said program of instructions including instructions for:

displaying a document on a first portion of a display device, said document capable of being transmitted from one computer to another computer in a network; and displaying an audit trail on a second portion of said display device; and automatically updating said audit trail when information relating to transmission of said document from one user to another user in said network changes.

19. The article of manufacture according to claim 18 further including instructions for:

storing in a first data field in said audit trail, data specifying a first user, said first user causing said document to be transmitted to a second user over said network;

storing in a second data field in said audit trail, data specifying said second user; and storing in a third data field in said audit trail, data specifying and action taken with regard to said document by said first or second user.

* * * * *